(12) United States Patent
Dymetman et al.

(10) Patent No.: US 9,753,893 B2
(45) Date of Patent: Sep. 5, 2017

(54) JOINT ALGORITHM FOR SAMPLING AND OPTIMIZATION AND NATURAL LANGUAGE PROCESSING APPLICATIONS OF SAME

(75) Inventors: Marc Dymetman, Grenoble (FR); Guillaume Bouchard, Saint Martin-le-Vinoux (FR)

(73) Assignee: XEROX CORPORATION, Norwalk, CT (US)

( * ) Notice: Subject to any disclaimer, the term of this patent is extended or adjusted under 35 U.S.C. 154(b) by 1149 days.

(21) Appl. No.: 13/525,513

(22) Filed: Jun. 18, 2012

(65) Prior Publication Data

US 2013/0338999 A1    Dec. 19, 2013

(51) Int. Cl.
  *G06F 17/27*    (2006.01)
  *G06F 17/18*    (2006.01)

(52) U.S. Cl.
  CPC .......... *G06F 17/18* (2013.01); *G06F 17/2715* (2013.01); *G06F 17/2775* (2013.01)

(58) Field of Classification Search
  CPC ... G06F 17/18; G06F 17/2715; G06F 17/2775
  USPC .......................................................... 704/9
  See application file for complete search history.

(56) References Cited

PUBLICATIONS

"A Brief Introduction to Graphical Models and Bayesian Networks", Retrieved from Internet on Oct. 14, 2011; http://www.cs.berkeley.edu/~murphyk/Bayes/bayes.html, pp. 1-19.
Gilks, et al. "Adaptive Rejection Sampling for Gibbs Sampling", Appl. Statist.(1992), 41, No. 2, pp. 337-348.
Gorur, et al. "Concave Convex Adaptive Rejection Sampling", Gatsby Computational Neuroscience Unit, pp. 1-16.
Hart, et al. "A formal basis for the Heuristic Determination of Minimum Cost Paths", IEEE Transactions of Systems Science and Cybernetics, vol. SSC-4, No. 2, Jul. 196, pp. 100-107.
Jordan, et al. "An introduction to Variational Methods for Graphical Models", Machine Learning, 1999, 37, pp. 183-233.
(Continued)

*Primary Examiner* — Jakieda Jackson
(74) *Attorney, Agent, or Firm* — Fay Sharpe LLP (57) ABSTRACT

In rejection sampling of a function or distribution p over a space X, a proposal distribution $q^{(n)}$ is refined responsive to rejection of a sample $x^* \in X$ to generate a refined proposal distribution $q^{(n+1)}$ selected to satisfy the criteria $p(x) \leq q^{(n+1)}(x) \leq q^{(n)}(x)$ and $q^{(n+1)}(x^*) < q^{(n)}(x^*)$. In a sampling mode, the sample $x^*$ is obtained by random sampling of the space X, the rejection sampling accepts or rejects $x^*$ based on comparison of a ratio $p(x^*)/q(x^*)$ with a random draw, and the refined proposal distribution $q^{(n+1)}$ is selected to minimize a norm $\|q^{(n+1)}\|_\alpha$ where $\alpha < \infty$. In an optimization mode, the sample $x^*$ is obtained such that $q^* = q^{(n)}(x^*)$ maximizes $q^{(n)}$ over the space X, the rejection sampling accepts or rejects $x^*$ based on a difference between or ratio of $q^*$ and $p(x^*)$, and the refined proposal distribution $q^{(n+1)}$ is selected to minimize a norm $\|q^{(n+1)}\|_\infty = \max\{q^{(n+1)}(x)\}$.

16 Claims, 6 Drawing Sheets

(56) References Cited

PUBLICATIONS

Propp, et al. "Exact Sampling with Coupled Markov Chains and Applications to Statistical Mechanics", Department of Mathematics, Massachusetts Institute of Technology, Jul. 16, 1996, 1-27.
Wainwright, et al. "Tree-reweighted belief propogation algorithms and approximate ML estimation by pseudo-moment matching", 2003, pp. 1-8.
Wetherell. "Probabilistic Languages: A Review and Some Open Questions", Computing Surveys, vol. 12, No. 4, Dec. 1980, pp. 1-19.
Yedidia, et al. "Generalized Belief Propagation", 2001, pp. 1-7.
Mansingha, et al. "Exact and Approximate Sampling by Systematic Stochastic Search", 2009, pp. 1-8.

JOINT ALGORITHM FOR SAMPLING AND OPTIMIZATION AND NATURAL LANGUAGE PROCESSING APPLICATIONS OF SAME

BACKGROUND

The following relates to the sampling arts, optimization arts, to applications of sampling such as sampling of hidden Markov models (HMMs), natural language processing (NLP) systems employing probabilistic context free grammars (PCFGs) augmented by constraints, and so forth.

A diverse range of problems can be formulated in terms of sampling of a space or domain (represented herein without loss of generality as X a sample of which may be denoted as x) in accordance with a target distribution, which is represented herein without loss of generality as p(x), which may or may not be normalized. A known approach for performing such sampling is a technique called rejection sampling. In this approach, sampling is performed in accordance with a proposal distribution, which is represented herein without loss of generality as $\bar{q}(x)$, where the overbar indicates a normalized distribution. Rejection sampling is premised upon finding an upper bound $\beta$ for the "density ratios" $\rho(x) \equiv p(x)/\bar{q}(x)$ over the whole of the sampling space X, to sample $x \sim \bar{q}$ (that is, sample x according to $\bar{q}$), and to accept x with probability $p(x)/(\beta\bar{q}(x))$. The average acceptance rate $\gamma$ is equal to $p(X)/\beta$ (which is always $\leq 1$), where p(X) is the total measure of X relative to p (the partition function of p). Efficient sampling is obtained by employing a proposal distribution $\bar{q}(x)$ that is a good approximation of the normalized target distribution $\bar{q}(X)$, and so the choice of $\bar{q}(x)$ is of substantial concern.

However, in practice it can be difficult to obtain a proposal distribution $\bar{q}(x)$ that closely approximates $\bar{q}(X)$. If $\bar{q}(x)$ is a poor approximation of p(x) then many samples obtained in accordance with the proposal distribution $\bar{q}(x)$ are rejected by the target distribution p(x), leading to poor sampling efficiency.

In adaptive rejection sampling (ARS), the rejected samples are used to improve the proposal distribution. ARS assumes that the target distribution p(x) is concave, in which case a tangent line at any given point on the target distribution is guaranteed to define an upper bound. This concavity aspect is used in ARS to refine the proposal distribution $\bar{q}(x)$ based on rejected samples. See Gilks et al., "Adaptive Rejection Sampling for Gibbs Sampling", App. Statist. vol. 41 pages 337-48 (1992).

Görür et al., "Concave Convex Adaptive Rejection Sampling", Technical Report, Gatsby Computational Neuroscience Unit (2008) (hereinafter "Görür et al.") discloses an improved ARS that is applicable to distributions whose log densities can be expressed as a sum of concave and convex functions, which expands the scope of applicability of ARS. Like conventional ARS, the approach of Görür et al. is generally limited to a target distribution p(X) that is continuous in one dimension. This is a consequence of reliance upon piecewise linear upper bounds that are refined based on rejected samples and that are assured of being upper bounds on account of the continuous curvature between the end points. Such techniques are difficult or impossible to adapt to more difficult problems in which the target distribution p(X) is multi-dimensional, and/or discrete, and/or highly discontinuous, or so forth.

Optimization is generally viewed as a problem that is separate and distinct from the sampling problem. Sampling endeavors to obtain a set of data points that is representative of (or, alternatively, in accordance with) a density function or distribution. In contrast, optimization endeavors to locate the maximum value of a function, which may or may not be a density function or distribution. The goal of optimization may be to find the highest value of the function, i.e. $p_{max}(x_0)$, or to find the spatial location in the space X of that maximum, i.e. to find the value $x_0$.

Some functions may be optimized analytically, e.g. by finding the point where the derivative of the function goes to zero. More commonly, optimization employs iterative approaches, such as the gradient descent method or the Levenberg-Marquardt algorithm. In principle, sampling can be employed for optimization, for example by a Monte Carlo approach in which samples are acquired and used to estimate the maximum value. Such sampling approaches are approximate, and the error is generally expected to roughly correlate with the sample size.

BRIEF DESCRIPTION

In some illustrative embodiments disclosed as illustrative examples herein, a non-transitory storage medium stores instructions executable by an electronic data processing device to perform rejection sampling to acquire at least one accepted sample of a function or distribution p over a space X in which a proposal distribution $q^{(n)}$ used in the rejection sampling is refined responsive to rejection of a sample $x^* \in X$ obtained in a current iteration of the rejection sampling to generate a refined proposal distribution $q^{(n+1)}$ for use in a next iteration of the rejection sampling wherein the refined proposal distribution $q^{(n+1)}$ is selected to satisfy the criteria $p(x) \leq q^{(n+1)}(x) \leq q^{(n)}(x)$ and $q^{(n+1)}(x^*) < q^{(n)}(x^*)$. In some embodiments the rejection sampling obtains the sample $x^*$ by random sampling of the space X, the rejection sampling accepts or rejects $x^*$ based on comparison of a ratio $p(x^*)/q(x^*)$ with a random draw, and the refined proposal distribution $q^{(n+1)}$ is selected to satisfy the criteria: $p(x) \leq q^{(n+1)}(x) \leq q^{(n)}(x)$ and $q^{(n+1)}(x^*) < q^{(n)}(x^*)$ and a norm $\|q^{(n+1)}\|_\alpha$ is minimized where $\alpha < \infty$. In some such embodiments $\alpha = 1$. In some embodiments the rejection sampling obtains the sample $x^*$ such that $q^* = q^{(n)}(x^*)$ maximizes $q^{(n)}$ over the space X, the rejection sampling accepts or rejects $x^*$ based on a difference between or ratio of $q^*$ and $p(x^*)$, and the refined proposal distribution $q^{(n+1)}$ is selected to satisfy the criteria: $p(x) \leq q^{(n+1)}(x) \leq q^{(n)}(x)$ and $q^{(n+1)}(x^*) < q^{(n)}(x^*)$ and a norm $\|q^{(n+1)}\|_\infty = \max\{q^{(n+1)}(x)\}$ is minimized. In some embodiments the non-transitory storage medium stores instructions executable by an electronic data processing device to perform said rejection sampling in one of two selectable modes: sampling mode and optimization mode.

In some illustrative embodiments disclosed as illustrative examples herein, an apparatus comprises: an apparatus comprises a non-transitory storage medium as set forth in the immediately preceding paragraph and an electronic data processing device configured to execute instructions stored on the non-transitory storage medium.

In some illustrative embodiments disclosed as illustrative examples herein, a method comprises, using an electronic data processing device, performing a current iteration (n) of rejection sampling including: obtaining a sample $x^*$ from a space X; accepting or rejecting the sample $x^*$ based on comparison of $q^{(n)}(x^*)$ and $p(x^*)$ where $q^{(n)}$ is a proposal distribution over the space X for current iteration (n) of the rejection sampling and p is a function or distribution over the space X; and refining the proposal distribution $q^{(n)}$ to generate a refined proposal distribution $q^{(n+1)}$ over the space X satisfying the criteria: $p(x) \leq q^{(n+1)}(x) \leq q^{(n)}(x)$ for all $x \in X$; $q^{(n+1)}(x^*) < q^{(n)}(x^*)$; and a norm $\|q^{(n+1)}\|_\alpha$ is minimized.

DETAILED DESCRIPTION

Figure 1:
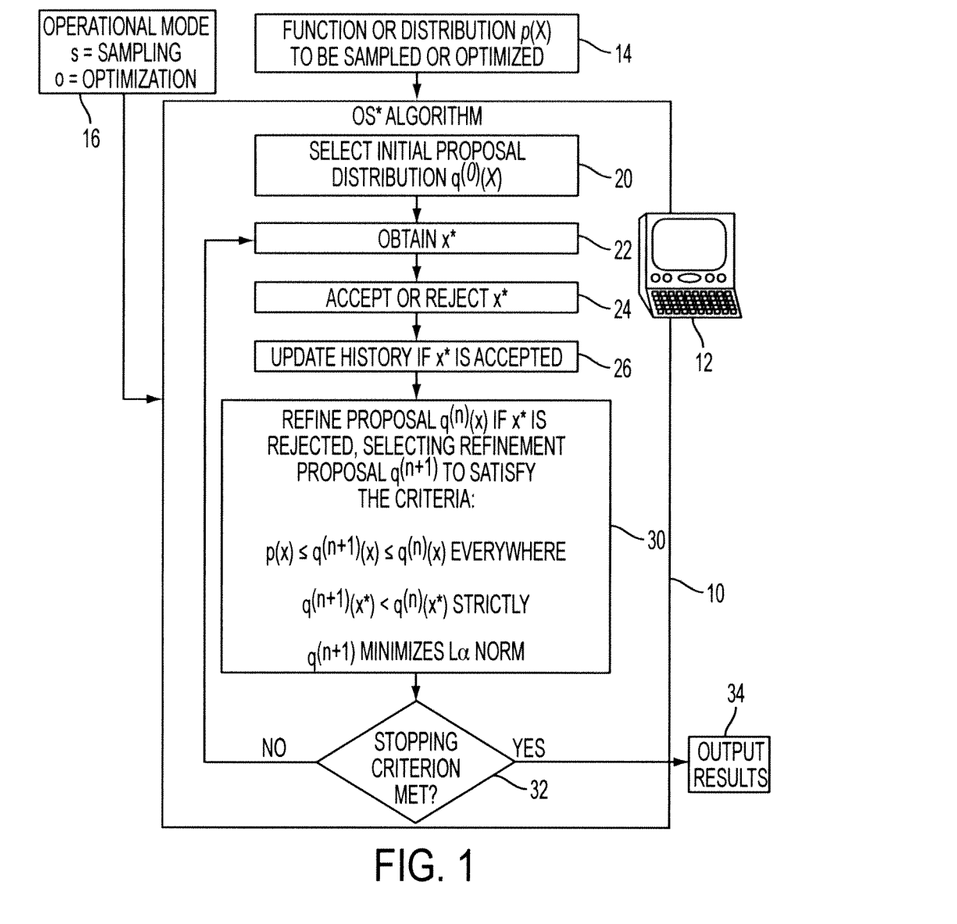
FIG. 1 diagrammatically shows an illustrative system for performing either sampling or optimization in accord with an operational mode.

With reference to FIG. 1, a joint algorithm for performing either sampling or optimization, referred to herein as the OS* algorithm 10, is described. The OS* algorithm 10 is suitably implemented by a computer or other electronic data processing device 12 that includes a processor (e.g., microprocessor, optionally multi-core) and data storage and that executes instructions to perform the OS* algorithm 10. The instructions that are executed by the computer or other electronic data processing device 12 to perform the OS* algorithm are suitably stored on a non-transitory storage medium (not shown) such as a hard disk or other magnetic storage medium, random access memory (RAM), read-only memory (ROM), or another electronic storage medium, an optical disk or other optical storage medium, a combination of the foregoing, or so forth.

Figure 2:
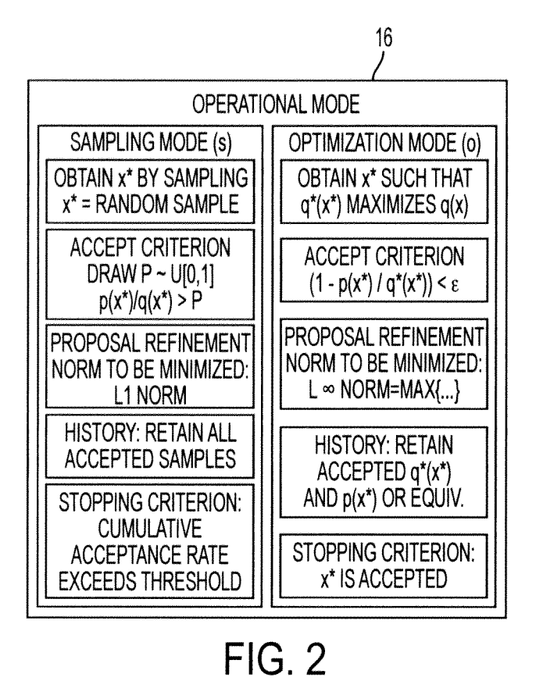
FIG. 2 diagrammatically shows settings controlled by the operational mode of the system of FIG. 1.

With reference to FIGS. 1 and 2, the OS* algorithm operates to sample or optimize a function or distribution 14, denoted herein as the function or distribution p which is defined over a space X which may be a one-dimensional space or a multi-dimensional space. Whether the OS* algorithm 10 performs sampling or optimization is controlled by an operational mode 16 which can be set to either sampling (s) or optimization (o). FIG. 2 presents the differences between the sampling and optimization modes.

The OS* algorithm 10 performs rejection sampling. To initiate, an initial proposal distribution 20 is selected. The initial proposal distribution is denoted $q^{(0)}(x)$ and is defined for samples $x \in X$. In an operation 22, a sample $x^*$ is obtained. In the case of sampling mode, the sample $x^*$ is obtained by random sampling. In the case of optimization mode, the sample $x^*$ is chosen to maximize $q^{(0)}(x)$ (for the first iteration), or more generally to maximize $q^{(n)}(x)$ (for iteration (n)). In an operation 24, the sample $x^*$ is accepted or rejected. The choice of acceptance criteria depends upon whether the OS* system 10 is operating in sampling mode or optimization mode. In the case of sampling mode, a suitable selection criterion is based on comparison of ratio $p(x^*)/q(x^*)$ with a random draw. (Here, the shorthand notation $q=q^{(n)}$ denotes the proposal distribution for the current iteration of the rejection sampling). The random draw can, for example, be a random draw from a normalized uniform probability distribution U[0,1] that has uniform value between zero and one and for which $\int_0^1 U[0,1]dv=1$. In the case of optimization mode, a suitable selection criterion is based on a difference between or ratio of $q^*$ and $p(x^*)$, where the shorthand $q^*=q(x^*)$ denotes the maximum value of q in the space X.

In an operation 26, if the sample $x^*$ is accepted (in operation 24) then a history is updated to include the sample $x^*$. In sampling mode, this entails adding the sample $x^*$ to a set of accepted samples. In optimization mode, only one sample is ultimately accepted, namely the first sample encountered for which the difference between or ratio of $q^*$ and $p(x^*)$ satisfies a maximum threshold $\epsilon$, i.e. $(q^*-p(x^*)) < \epsilon$. (As will be further explained herein, that maximum threshold $\epsilon$ will define an error metric for the optimized value of p).

On the other hand, in an operation 30, if the sample $x^*$ is rejected (in operation 24) then the proposal distribution $q^{(n)}$ is refined to generate a refined proposal distribution $q^{(n+1)}$ for use in a next iteration of the rejection sampling. The refined proposal distribution $q^{(n+1)}$ is selected to satisfy the following criteria: $p(x) \leq q^{(n+1)}(x) \leq q^{(n)}(x)$ (where the first inequality ensures that $q^{(n+1)}$ is an upper bound on $p(x)$ and the second inequality ensures that the refined proposal distribution $q^{(n+1)}$ is no worse than $q^{(n)}$ for any point in the space X); $q^{(n+1)}(x^*) < q^{(n)}(x^*)$ (which ensures that the refined proposal distribution $q^{(n+1)}$ is better than $q^{(n)}$ at the rejected sample $x^*$); and a norm $\|q^{(n+1)}\|_\alpha$ is minimized. The value of $\alpha$ in this third criterion depends on the operational mode. For sampling, $\alpha < \infty$ and more preferably $\alpha=1$. In this case, choosing $q^{(n+1)}$ to minimize the L1 norm $\|q^{(n+1)}\|_1$ ensures that the chosen $q^{(n+1)}$ lowers the overall refined proposal distribution $q^{(n+1)}$ as much as possible. For sampling, $\alpha=\infty$, which takes advantage of the equivalency $\|q^{(n+1)}\|_\infty = \max\{q^{(n+1)}\}$. Thus, minimizing $\|q^{(n+1)}\|_\infty$ ensures that the chosen $q^{(n+1)}$ lowers the maximum value of the refined proposal distribution $q^{(n+1)}$ as much as possible.

The operations 22, 24 and operation 26 (for acceptance) or operation 30 (for rejection) form one iteration of the rejection sampling. In a decision 32, it is determined whether the stopping criterion is met. In the case of sampling, a plurality of accepted samples are to be determined in accord with the distribution $p(x)$ (in its normalized form, i.e. $\bar{p}(x)$), and a suitable stopping criterion is when the cumulative acceptance rate of the rejection sampling exceeds a threshold. In the case of optimization, a single maximum value for the distribution $p(x)$ is to be determined, and so a suitable stopping criterion is when the first sample $x^*$ is accepted. If the stopping criterion is not met, processing flows back to the operation 22 to obtain the next sample $x^*$ which is processed using the refined proposal distribution $q^{(n+1)}$, and so forth. When the stopping criterion is met at decision 32, the results are output in operation 34. In the case of sampling, the output suitably includes the set of accepted samples. The sampling results optionally additionally or alternatively include the last refinement of the proposal distribution q, which can subsequently be used to produce further exact samples from the target distribution $p(x)$. In the case of optimization, the output is the (single) accepted sample corresponding to the maximum value of the distribution $p(x)$. Since the true maximum value of $p(x)$ is known to have lower bound $p(x^*)$ and upper bound $q^*$, the maximum value can be well-approximated as $q^*=q(x^*)$ or as $p(x^*)$ or as some intermediate value, e.g. $(q^*+p(x^*))/2$. Optionally, the operation 34 in the case of optimization also outputs an error metric computed based on the values $p(x^*)$ and $q^*=q(x)$ for the accepted sample distribution $x^*$. For example, the optimization output can be $(q^*+p(x^*))/2 \pm (q^*-p(x^*))/2$ or, in slightly less aggressive form, can be $(q^*+p$ $(x^*))/2\pm\epsilon/2$, the latter following since $(q^*-p(x^*))<\epsilon$ is the acceptance/stopping criterion for optimization.

FIG. 2 summarizes the differences between the sampling mode and optimization mode. These differences include: how the sample $x^*$ is obtained in the operation 22 (by random sampling or, for optimization, by identifying $x^*=\text{argmax}_x\{q(x)\}$); the acceptance criterion for accepting the sample $x^*$; the norm used in the proposal distribution refinement; the history (retain a set of accepted samples in the case of sampling, or only the first accepted sample in the case of optimization); and the stopping criterion (suitably based on cumulative acceptance rate for sampling, or stop after the first sample is accepted in the case of optimization). Advantageously, the same OS* algorithm 10 can perform either sampling or optimization in accord with the chosen operational mode 16.

Further disclosure including some conceptual bases for the OS* algorithm are set forth in the following.

Suppose that $\mu$ is a base measure on a space X and that p is a $L_1$ nonnegative function on $(X,\mu)$, i.e. $\int_X p(x)d\mu(x)<\infty$, and let us define $$\bar{p}(x) \equiv \frac{p(x)}{\int_X p(x)d\mu(x)}.$$

The function p can then be seen as an unnormalized density over X, and $\bar{p}$ as a normalized density which defines a probability distribution over X, referred to herein as the target distribution, which is the distribution we are interested to sample from (by abuse of language, we will also say that a sample from $\bar{p}$ is a sample from p). While it may or may not be possible to sample directly from the target distribution, it is assumed that it is possible to compute $p(x)$ for any given x. Rejection Sampling (RS) then works as follows. A certain unnormalized proposal density q is defined over X, which is such that (i) it is known how to directly sample from it (more precisely, from $\bar{p}$), and (ii) for all $x\in X, p(x)\leq q(x)$. This latter condition states that $q(x)$ is an upper bound on $p(x)$. The following iterative process is then performed: (1) a sample x is drawn from q, (2) the ratio $r(x)\equiv p(x)/q(x)\leq 1$ is computed, (3) the sample x is accepted with probability $r(x)$, otherwise sample x is rejected, (4) repeat steps (1)-(3) iteratively. It can then be shown that this procedure produces an exact sample from p. The average rate at which the RS produces accepted samples, that is, the acceptance rate, is equal to $P(X)/Q(X)$, where for a (measurable) subset A of X, the parameter $P(A)\equiv\int_A p(x)d\mu(x)$ is defined (and similarly with Q). Put another way, the acceptance rate is that equal to the ratio of the surface below the p curve with that below the q curve.

To maximize the acceptance rate, the q curve should be made as low as practicable while keeping it above the p curve. Toward this end, Adaptive Rejection Sampling (ARS) techniques have been developed. See Gilks et al., "Adaptive rejectin sampling for Gibbs sampling", Applied Statistics pages 337-348 (1992); Görür et al., "Concave convex adaptive rejection sampling", Technical Report, Gatsby Computational Neuroscience Unit, 2008. In ARS, at certain stages of the process the q curve is updated to a lower curve q' with a better acceptance rate. These techniques have predominantly been applied to the case where X is the one-dimensional real line and where p is a concave, log-concave or piecewise log-concave curve, in which case it is possible to exploit convexity properties to progressively better and better approximate p by an upper bound consisting of a piecewise linear envelope.

In the OS* algorithm described with reference to FIG. 1, adaptive rejection sampling is applied in which the refinement proposal distribution q is selected to satisfy the criteria $p(x)\leq q^{(n+1)}(x)\leq q^{(n)}(x)$ and $q^{(n+1)}(x^*)<q^{(n)}(x^*)$ and minimization of a norm $\|q^{(n+1)}\|_\alpha$. Moreover, it is disclosed that the OS* algorithm can be used for either sampling or optimization with suitable configuration as disclosed herein (e.g., see FIG. 2). For convenience, when OS* is applied in sampling mode it is referred to as $OS^*_S$ while when OS* is applied in optimization mode it is referred to as $OS^*_O$. It should be noted that while the general OS* algorithm can be used in either sampling mode or optimization mode, a given implementation of the OS* algorithm may be configured to perform only sampling (for example, by hard-coding the sampling mode settings shown in FIG. 2), or a given implementation of the OS* algorithm may be configured to perform only optimization (for example, by hard-coding the optimization mode settings shown in FIG. 2).

Figure 3:
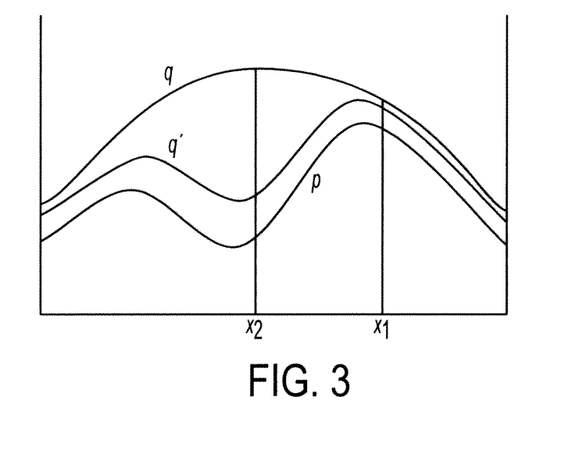
FIG. 3 diagrammatically show operation of the OS* algorithm disclosed herein operating in sampling mode.

With reference to FIG. 3, operation of the OS* algorithm in sampling mode (that is, $OS^*_S$ operation) is described. The sampling starts with an initial proposal density q. The first sample is sample $x_1$, for which the ratio $r_q(x_1)=p(x_1)/q(x_1)$ is close to 1; this leads, say, to the acceptance of sample $x_1$. The next iteration produces sample $x_2$, for which the ratio $r_q(x_2)=p(x_2)/q(x_2)$ is much lower than 1, leading, say, to a rejection. Nonetheless, the rejection yields some useful information, namely that $p(x_2)$ is much lower than $q(x_2)$, and that evidence is used to define a new proposal distribution q' which has the following properties: $p(x)\leq q'(x)\leq q(x)$ everywhere on X; and $q'(x_2)<q(x_2)$ at the sample $x_2$. One extreme way of obtaining such a q' is to set $q'(x_2)=p(x_2)$ and to maintain $q'(x)=q(x)$ everywhere other than $x_2$. If the space X is discrete, then this choice of q' has the effect of improving the acceptance rate, but only slightly so, by insuring that any time q' happens to select $x_2$, it will accept it. If the space X is continuous, then this choice of q' is essentially of no improvement at all, since q'=q almost everywhere.

A better generic way to find a q' is the following. Suppose that a finite set of "one-step refinement actions" $a_j$ are available, depending on q and $x_2$, which are able to move from q to a new $q_j=a_j(q,x_2)$ such that for any such $a_j$ one has $p(x)\leq q_j(x)\leq q(x)$ everywhere on X and also $q_j(x_2)<q(x_2)$. Then from among these available refinement actions the "best" refinement $a_j$ is chosen. For sampling, this "best" refinement is suitably the one that is such that the $L_1$ norm of $q_{j'}$ is minimal among the possible j's, or in other words, such that $\int_X q_j(x)d\mu(x)$ is minimal in j. With this selection, the acceptance rate of $q'_j$ (which depends directly on $\|q'_j\|_1$) is improved as much as possible, while (i) not having to explore a too large space of possible refinements (assuming that the set $\{a_j\}$ is reasonably small), and (ii) moving from a representation for q to an only slightly more complex representation for $q'_j$, rather to a much more complex representation for a q' that could result from exploring a larger space of possible refinements for q.

Said otherwise, in the $OS^*_S$ operation of FIG. 3, After a rejection at $x_2$, the proposal distribution q is refined to q' in such a way that $q'(x_2)$ is strictly below $q(x_2)$. This could be done by taking a "narrow dip" at $x_2$, with $q'(x_2)=p(x_2)$ and keeping q' equal to q elsewhere, but it is more efficient—in terms of decreasing the surface between q and p—to take a less narrow dip, as shown in FIG. 3. The refinement q' is then chosen to maximize the surface decrease among a small list of possible one-step refinements of q.

Figure 4:
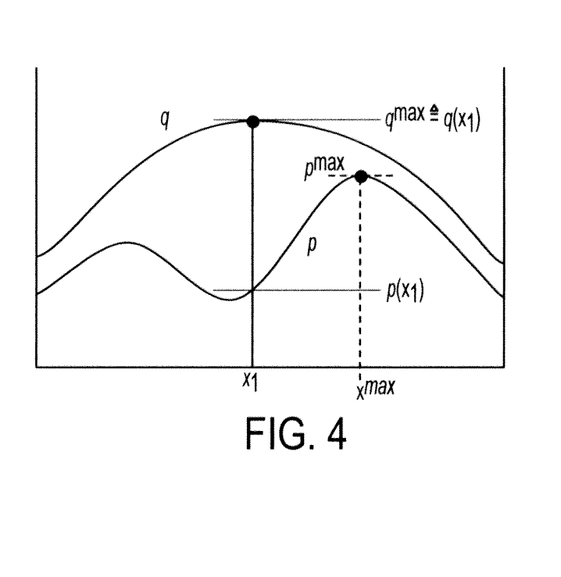
FIGS. 4 and 5 diagrammatically show operation of the OS* algorithm disclosed herein operating in optimization mode.
Figure 5:
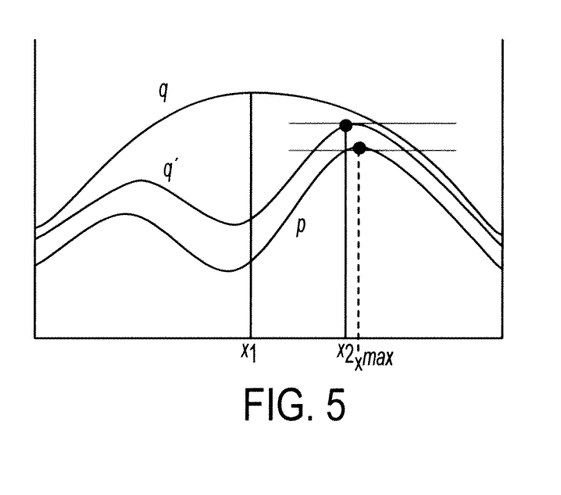

With reference to FIGS. 4 and 5, operation of the OS* algorithm in optimization mode (that is, OS*$_O$ operation) is described. FIG. 4 shows the function p to be optimized (namely maximized in this example). The (unknown) maximum $p^{max}$ is indicated in FIG. 4 by a black circle on the p curve, and corresponds to $x^{max}$ in X. FIG. 4 also shows a proposal function q which is such—analogously to the sampling case—that the following criteria are met: (1) the function q is above p on the whole of the space X and (2) it is possible to directly find the point $x_1$ in X at which q reaches its maximum $q^{max}$, shown as a black circle on the q curve.

The following observation is made. Suppose that the distance between $q(x_1)$ and $p(x_1)$ is smaller than $\epsilon$. Then it follows that the distance between $q(x_1)$ and $p^{max}$ is also smaller than $\epsilon$. This can be seen graphically in FIG. 4, and is due to the fact that on the one hand $p^{max}$ is higher than $p(x_1)$ (or, at most, $p(x_1)=p^{max}$ in the case where $x_1=x^{max}$ precisely), and that on the other hand $p^{max}$ is below $q(x^{max})$, and a fortiori below $q(x_1)$. In other words, if the maximum $q^{max}$ for the proposal function q is at a coordinate $x_1$ and $q(x_1)-p(x_1)<\epsilon$, then we can conclude that we have found the maximum of p up to an error metric $\epsilon$.

In the case of $x_1$ in FIG. 4, the difference $q(x_1)-p(x_1)$ is relatively large, and so the sample $x_1$ is rejected in operation 24 (see FIG. 1) and the proposal distribution q is refined into q' (operation 30 of FIG. 1) using the same approach as in the sampling case, but with one difference: the one-step refinement option $a_j$ that is selected is now chosen to minimize the $L_\infty$ norm, which is equivalent to the maximum value, i.e. $\|q'\|_\infty = \max\{q'(x)\}$. In other words, the minimization of the $L_1$ norm of q in the case of sampling is replaced by minimization of the $L_\infty$ norm. With reference to FIG. 5, once this q' has been selected, one can then find its maximum at $x_2$ and then the process can be repeated with $q^{(1)}=q, q^{(2)}=q', \ldots$ until the difference between $q^{(k)}(x_k)$ and $p(x_k)$ is smaller than a certain predefined threshold, e.g. error metric $\epsilon$.

To summarize the optimization (OS*$_O$) operation, when $x^{max}$ is the location in X of the maximum $p^{max}$ of p, and $x_1$ is the location in X of the maximum $q^{max}$ of q, then the (unknown) distance $|q(x_1)-p^{max}|$ is smaller or equal to the "gap" $|q(x_1)-p(x_1)|$, which is a known quantity. It can also be stated that the (also unknown) distance $|p^{max}-p(x_1)|$ is smaller or equal to the known gap $|q(x_1)-p(x_1)|$. So, one can say that the maximum of p is $q^{max}$ with an error metric $|q(x_1)-p(x_1)|$. Alternatively, one can say that the maximum of p is $p(x_1)$ with the error metric $|q(x_1)-p(x_1)|$. By splitting the difference, one can also say that maximum of p is $(q^{max}+p(x_1))/2 \pm |q(x_1)-p(x_1)|/2$. If the error is unacceptably large, then the sample $x_1$ is rejected, a refinement proposal q' is generated, and its maximum $x_2$ is computed. If the gap $|q(x_2)-p(x_2)|$ is small enough, the point $x_2$ is accepted, otherwise the process continues to iterate.

While sampling and optimization are usually seen as two different and distinct tasks, as disclosed herein they can actually be viewed as two extremities of a continuous range, when considered in the context of $L_p$ spaces. Roughly speaking, if $(X,\mu)$ is a measure space, and if $f$ is a real-valued function on this space, one defines the $L_p$ norm $\|f\|_p$, for $1 \le p < \infty$ as:

$$\|f\|_p = (\int_X |f|^p(x) d\mu(x))^{1/p} \quad (1)$$

with the $L_\infty$ norm $\|f\|_\infty$ defined as:

$$\|f\|_\infty = \inf\{C \ge 0: |f(x)| \le C \text{ for almost every } x\} \quad (2)$$

where the right term is called the essential supremum of $|f|$, and can be thought of roughly as the "max" of the function. So, with some abuse of language, one can write:

$$\|f\|_\infty \equiv \max_{x \in X} |f|. \quad (3)$$

The space $L_p$, for $1 \le p \le \infty$, is then defined as being the space of all functions $f$ for which $\|f\|_p < \infty$. Under the condition that $\|f\|_p < \infty$ for some $p < \infty$, it follows that:

$$\lim_{p \to \infty} \|f\|_p = \|f\|_\infty. \quad (4)$$

In the following, the notation $L_\alpha$ is used to indicate the norm, rather than the more conventional notation of norm $L_p$, in order to avoid confusion between the norm index subscript and the target distribution p on which sampling or optimization is performed.

The standard notion of rejection sampling is obtained by performing the OS* algorithm of FIG. 1 using the $L_1$ norm (i.e., $\alpha=1$ for sampling). However the following generalization is introduced herein: We will say that we are performing sampling of a non-negative function f relative to $L_\alpha(X,\mu)$, for $1 \le \alpha < \infty$, if $f \in L_\alpha(X,\mu)$ and if we sample—in the standard sense—according to the normalized density distribution $$\bar{f}(x) \equiv \frac{f(x)^p}{\int_X f(x)^p d\mu(x)}.$$

In the case $\alpha = \infty$, we will say that we are sampling relative $L_\infty(X,\mu)$, if $f \in L_\infty(X,\mu)$ and if we perform optimization relative to $f$, more precisely, if for any $\epsilon > 0$, we are able to find an x such that $|\|f\|_\infty - f(x)| < \epsilon$.

The general design for performing the OS* algorithm of FIG. 1 can be described as follows. The goal is to OS-sample from p, where "OS-sample" refers to a generalized sense that covers both sampling and optimization. We have at our disposal a family Q of proposal densities over the space $(X,\mu)$, such that, for every $q \in Q$, we are able to OS-sample efficiently from q. Upon rejection of a sample $x_1$ relative to a proposal q, with $p(x_1) < q(x_1)$, we have at our disposal a (limited) number of possible "one-step" refinement options q', with $p \le q' \le q$, and such that $q'(x_1) < q(x_1)$. We then select one such q'. A suitable selection criterion is to prefer the q' which has the smallest $L_1$ norm (sampling case) or the smallest $L_\infty$ norm (optimization). Other criteria can be used, such as selecting the q' that minimizes $q'(x_1)$. The OS* algorithm iterates until a suitable stopping criterion is met. In the case of sampling, one suitable stopping criterion is when the cumulative acceptance rate is above a certain threshold. In the case of optimization, the iterating suitably stops when the ratio $p(x_1)/q(x_1)$ is closer to 1 than a certain threshold, with $x_1$ being the maximum for q. The threshold then provides an error metric (i.e., maximum error) for the determined maximum of the target distribution p.

The following Algorithm 1 presents pseudo-code for performing the OS* algorithm selectably for either sampling or optimization:

| Algorithm 1 The OS* algorithm |
| --- |
| 1: while not Stop(h) do |
| 2:   OS-Sample x ~ q |
| 3:   r ← p(x)/q(x) |
| 4:   Accept-or-Reject(x, r) |
| 5:   Update(h, x) |
| 6:   if Rejected(x) then |
| 7:     q ← Refine(q, x) |
| 8: return q along with accepted x's in h |

Algorithm 1 parallels the OS* algorithm shown in FIG. 1. The OS-Sample subroutine corresponds to operation 22, the subroutine Accept-or-Reject corresponds to operation 24, The Update subroutine corresponds to operation 26, the Refine subroutine corresponds to operation 30, and the Stop subroutine corresponds to decision operation 32.

On entry into Algorithm 1, we assume that we are either in sample mode or in optimize mode, and also that we are starting from a proposal q which (1) dominates p and (2) from which we can sample or optimize directly. We use the terminology OS-Sample to represent either one of these cases, where OS-Sample x: q refers to sampling an x according to the proposal q or optimizing x on q (namely finding an x which is an argmax of q), according to the situation. On Algorithm 1 line (1), h refers to the history of the sampling so far, namely to the set of attempts $x_1$, $x_2$, . . . that have been done so far, each being marked for acceptance or rejection (in the case of sampling, this is the usual notion, in the case of optimization, all but the last proposal will be marked as rejections). (In the OS* algorithm of FIG. 1, corresponding operation 26 is modified slightly versus Algorithm 1 in that operation 26 is performed only upon acceptance so that rejections are not recorded in the history. Alternatively, operation 26 can record both acceptances and rejections, which can be useful in calculating acceptance rate, although this rate can also be calculated by tracking the count of acceptances and the total number of iterations). The stopping criterion Stop(h) is suitably as follows. In sampling mode, if the number of acceptances so far relative to the number of attempts is larger than a certain predefined threshold, and in this case will return on line (8), first, the list of accepted x's so far, which is already a valid sample from p, and second, the last refinement q, which can then be used to produce any number of future samples as desired with an acceptance ratio similar to the one observed so far. In optimization mode, if the last element x of the history is an accept, and in this case will return on line (8), first the value x, which in this mode is the only accepted attempt in the history, and second, the information on the maximum, e.g. p(x) and q(x) for the accepted x from which one can compute the maximum value and its error.

On Algorithm 1 line (3), the ratio r is computed, and then on line (4) we decide to accept x or not based on this ratio; in optimization mode, we accept x if the ratio is close enough to 1, as determined by a threshold; in sampling mode, we accept x based on a Bernoulli trial of probability r. On line (5), the history is updated by recording the trial x and whether it was accepted or not (or, alternatively, line (5) can be performed only for accepted samples). If x was rejected (Algorithm 1 line (6)), then on line (7), a refinement of q is performed.

In the following, some illustrative applications of the OS* algorithm are set forth. These are merely illustrative examples, and it is to be understood that the OS* algorithm disclosed herein is suitably employed in substantially any application that utilizes sampling, optimization, or both.

In the following, some natural language processing (NLP) applications are described. Numerous NLP problems entail optimizing and/or sampling from a complex objective function p. Some examples include: efficient decoding and sampling with high-order hidden Markov Models (HMMs); combination of a probabilistic context-free grammar (PCFG) with a complex finite-state automaton (FSA) for applications such as tagging by joint usage of a PCFG and a HMM tagger or hierarchical translation with a complex target language model; parsing in the presence of non-local features; implementing PCFGs with transversal constraints or probabilistic unification grammars; and so forth. For illustrative purposed, the following concentrates on (i) decoding and sampling with high-order HMM's, and (ii) combining a PCFG with a complex finite-state language model.

Considering first the optimization case, suppose, for simplicity, that we want to decode (i.e. optimize) with a bigram HMM, where the hidden layer consists of a string x of English words, and where each word $x_i$ in the string is associated with an acoustic observation $o_i$. Thus, each bigram $x_{i-1} x_i$ in the hidden layer contributes a factor $w_2(x_i | x_{i-1}) \equiv p(x_i | x_{i-1}) p(o_i | x_i)$. We are then trying to find a string $x = x_1, \ldots, x_n$ that maximizes the quantity:

$$p(x | o) \propto \prod_i w_2(x_i | x_{i-1}). \quad (5)$$

Let us just write $p(x) = \Pi_i w_2(x_i | x_{i-1})$; we are then trying to maximize p(x) over word strings of length n. We now introduce the following notion. For a given word $x_i$ in the vocabulary, let us define:

$$w_1(x_i) \equiv \max_{x_{i-1}} w_2(x_i | x_{i-1}), \quad (6)$$

where the max is over all possible words $x_{i-1}$ in the vocabulary, and which we call the "max backoff", or "optimistic backoff" of the set of bigrams whose last word is $x_i$. The application of OS*$_O$ to this setup is now as follows. We define the initial proposal $q^{(1)}$ as:

$$q^{(1)}(x) \equiv \prod_i w_1(x_i). \quad (7)$$

We see that $q^{(1)}(x) \geq p(x), \forall x$, meaning that $q^{(1)}$ dominates p over the space of strings, as required of a proposal. Note that $q^{(1)}$ does not necessarily correspond to a normalized distribution, and typically $\Sigma_x q^{(1)}(x) > 1$.

Figure 6:
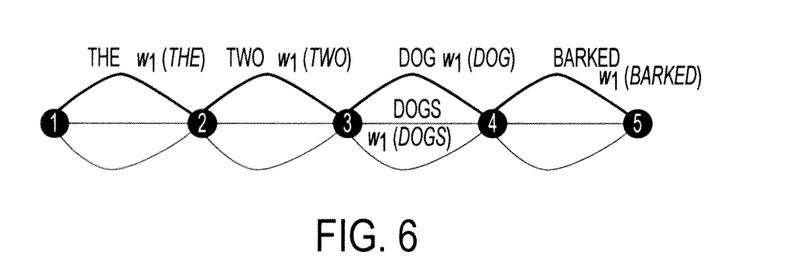
FIGS. 6-9 diagrammatically show illustrative weighted finite state automatons (WFSA's) used in conjunction with illustrative natural language processing (NLP) application examples presented herein.

With reference to FIG. 6, it is possible to find the point $x^{(1)}$ at which $q^{(1)}$ reaches its maximum, by applying the standard Viterbi decoding technique to the WFSA (weighted finite state automaton) representing $q^{(1)}$. FIG. 6 shows an illustrative example of a weighted automaton representing the proposal $q^{(1)}$, where the weights on edges correspond only to unigram max-backoffs. The automaton of FIG. 6 is a simple example, with only 5 states, and the usual dynamic programming techniques either for Viterbi decoding (optimization) or weight normalization into a probability distribution are then very efficient. In FIG. 6, only the optimization case is shown, and the optimal path relative to this automaton is shown with bold edges: "the two dog barked".

In FIG. 6 we assume that we have four acoustic observations, and have highlighted the path $x^{(1)}$=the two dog barked, which maximizes $q^{(1)}(x)$, and have left the other paths implicit below the highlighted path.

Now, suppose for the sake of the example that $q^{(1)}(x^{(1)})=0.06$, with $w_1(dog)=0.2$, but that $p(x^{(1)})=0.00005$, with in particular the true bigram weight of dog in this context being $w_2(dog|two)=0.0002=w_1(dog)$, while the other bigram weights $w_2$ in $x^{(1)}$ are not very different from their optimistic unigram backoff $w_1$. Based on this observation of a large difference between $w_2(dog|two)=0.0002$ and $w_1(dog)$, the sample is rejected and the proposal $q^{(1)}$ is refined into $q^{(2)}$, where the only difference is that now $q^{(2)}$ "takes into account" the bigram two dog, with its contextual weight $w_2(dog|two)$.

Figure 7:
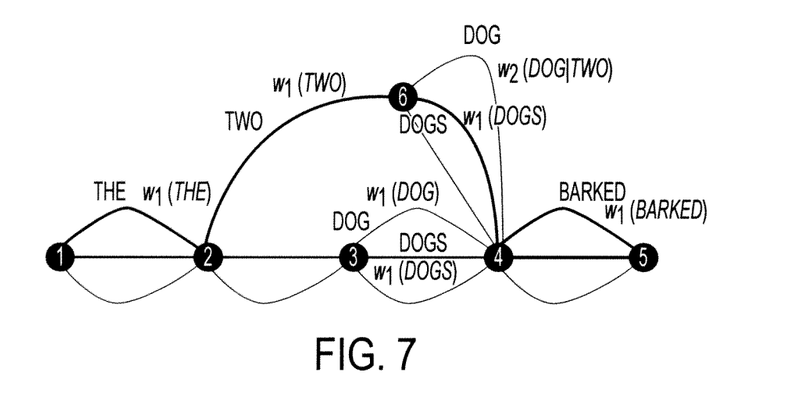

With reference to FIG. 7, the situation resulting after moving from the automaton $q^{(1)}$ to the automaton $q^{(2)}$ is depicted. The updated automaton shown in FIG. 7 corresponds to $q^{(2)}$, after incorporation of knowledge about $w_2(dog|two)$. Now it is the path the two dogs barked which is the current maximum. The differences between FIG. 7 and FIG. 6 are as follows. First, we have added a state (6) to the five original states, which is reached if we have just seen the word two after state (2), but not if we "come" from (2) through another word; thus this state is specific to the context (.|two). Second, we have copied the edges connecting (3) to (4) to edges connecting (6) to (4). We have also copied the $w_1$ weights of these edges, but for the single edge dog from (6) to (4), of which we have updated the weight from $w_1(dog)$ to $w_2(dog|two)$. We have been able to do that because the context associated with (6) is now specific enough that we know that we come from two. All other edges in the graph have kept their original $w_1$ weights.

Now, the $q^{(2)}$ proposal corresponding to this new deterministic automaton is defined as being the function that to a string of words $x_1x_2x_3x_4$ in the graph gives the weight obtained by multiplying the weights associated with the edges traversed by the unique path associated with this string. In particular $q^{(2)}$(the two dog barked) is equal to $w_1$(the).$w_1$(two).$w_2$(dog|two).$w_1$(barked), which is smaller than $w_1$(the).$w_1$(two).$w_1$(dog).$w_1$(barked).

At this point, we decode again—through standard Viterbi-type dynamic programming decoding—using the automaton $q^{(2)}$, and it is possible that the optimum path $x^{(2)}$ relative to $q^{(2)}$ is now different from $x^{(1)}$; for example, it may be the path highlighted in the figure: the two dogs barked.

We then iterate the process with this new path, comparing its true weight $p(x^{(2)})$ to its $q^{(2)}$ weight. If the difference is above a threshold, we refine again; this can be done by identifying among the words making up $x^{(2)}$ which one, if its context was extended by one word, would correspond to the largest decrease in the value of $q^{(2)}(x^{(2)})$. Thus, we compare the ratios $w_2$(two|the)/$w_1$(two),$w_2$(dogs|two)/$w_1$(dogs),$w_2$(barked|dogs)/$w_1$(barked), and determine the smallest such ratio—which could be said informally to correspond to the "most violated constraint", or to the "largest disappointment"—and decide to refine the corresponding context by one more word. This can be done similarly to what we have done previously, namely by adding one more state to the automaton, copying some edge, and decreasing the weight of one of the edges.

The procedure that we have sketched for a bigram HMM can be directly extended to any n-gram HMM. For instance, if p is a 5-gram HMM, then we can introduce recursively the following max backoffs:

$$w_5(x_5 \mid x_1x_2x_3x_4) \equiv p_5(x_5 \mid x_1x_2x_3x_4) \quad (8)$$

$$w_4(x_5 \mid x_2x_3x_4) \equiv \max_{x_1} w_5(x_5 \mid x_1x_2x_3x_4)$$

$$w_3(x_5 \mid x_3x_4) \equiv \max_{x_2} w_4(x_5 \mid x_2x_3x_4)$$

$$w_2(x_5 \mid x_4) \equiv \max_{x_3} w_4(x_5 \mid x_3x_4)$$

$$w_1(x_5) \equiv \max_{x_4} w_4(x_5 \mid x_4).$$

In this general case, when refining the current best path in the automaton $q^{(k)}$, we might have the choice between expand on this path, say, the context of an existing unigram, bigram, trigram or even of an existing quadrigram, and we could then choose to expand the one which results in the largest "disappointment".

We stop the refinement process when the ratio $p(x^{(k)})/q^{(k)}(x^{(k)})$ is closer to 1 than an arbitrary threshold, or even, if we prefer, when $p(x^{(k)})/q^{(k)}(x^{(k)})=1$, which will be reached at a certain point because we cannot introduce in the automaton more states than there are in the true FSA corresponding to p.

It is noteworthy that, typically, when we stop on the automaton $q^{(k)}$ with the result $x^{(k)}$, we will have introduced many fewer states than would have been necessary to do Viterbi decoding with the automaton underlying the true distribution p. One way to get a feeling for that is the following informal observation. Suppose that the p model is a 7-gram model. Suppose that the true optimum string according to p relative to an acoustic sequence of 11 words, is the sentence x=The best way to predict the future is to invent it, (attributed to Alan Kay) but also suppose—a supposition that is not unrealistic—that even limiting oneself to $w_3$ backoffs, for all other 11-word sentences x' one has $w_3(x')<p(x)=w_7(x)$. Let us then consider an approach that, when it decides which n-gram to refine in a sequence, limits its choices to lower-order n-grams before considering refinement of some higher-order n-gram in the string. In such a situation, the algorithm will never produce any m-gram where m>3 and where this m-gram is not a substring of x. This is because, if the algorithm were ever to produce such an m-gram, this would mean that it would have produced at some point $q^{(k)}$ a sequence $x^{(k)}$ different from x, but for which the $w_3$ optimistic estimate would have been larger than $q^{(k)}(x)$, which would imply that this estimate would have been larger than p(x), a contradiction. Thus, in the situation where trig ram-level optimistic estimates of competitors of x are already worse than the true value of x, the algorithm disclosed herein does not need to take into account many high-order states that the standard Viterbi decoder has to explicitly represent.

The sampling algorithm for high order HMMs is analogous to the optimization version. In the optimization case, it was assumed all along that we were able to find the maximum path in the $q^{(k)}$ automaton, via the usual dynamic programming procedure. In substance, starting from the final state, this procedure computes, for each state, the maximum weight of a path connecting this state to the final state, and iterates this procedure for states farther and farther from the end state. The main difference in sampling is that, instead of finding the maximum path from a given state to the final state, we need to compute the sum of the weights of all the paths connecting this state to the final state, and iterate the procedure similarly to the previous case. Formally, we are operating now in the sum-product semiring while in the optimization case we were operating in the max-product semiring (of which the log version is called the tropical semiring), but otherwise, the procedures are the same. Once these sums have been computed on all the states of the $q^{(k)}$ automaton, they can be used directly to sample from the automaton, by moving forward in the standard way. The refinements are then performed on rejects from the rejection sampler with $q^{(k)}$, up to the time the acceptance rate becomes acceptable, i.e. above a certain reasonable threshold. If x is the rejected string, one selects, as in the optimization case, one of the n-grams for contextual refinement. While a possibility is to select this n-gram based on how much this choice decreases the value of $q^{(k+1)}(x)$ relative to $q^{(k)}(x)$, another possibility is to select it based on how much the choice decreases the overall mass of $q^{(k+1)}(x)$ relative to that of $q^{(k)}(x)$, which is more in line with the $L_1$ objective that is most relevant for sampling. Once we have found a $q^{(k)}$ for which the observed acceptance rate (or more precisely, the cumulative observed acceptance rate for all the attempts done until this point, with all the refined automata up to the current $q^{(k)}$) is above a threshold, we stop the refinements, and use this final automaton for sampling an arbitrary number of times.

As another example, the application of the OS* algorithm for intersecting PCFG's with high-order LM's is described. This is a component sometimes used in statistical machine translation (SMT), for example.

A standard result of formal language theory is that the intersection of a context-free grammar (CFG) with a finite state automaton (FSA) is a CFG. This construct can be generalized to the intersection of a Weighted CFG (WCFG) with a Weighted FSA (WFSA) (see e.g. Nederhof et al., "Probabilistic parsing as intersection", in Proc. $8^{th}$ Int'l. Workshop on Parsing Technologies, 2003), resulting in a WCFG. In our case, this entails optimizing and sampling from the intersection p of a PCFG G with a complex WFSA A representing a high-order language model (LM). For illustration purposes, it is assumed here that A is a trigram language model, but the description can readily be transposed to higher-order cases.

Let us denote by x a derivation in G, and by y=y(x) the string of terminal leaves associated with x (the "yield" of the derivation x). The weighted intersection p of G and A is defined as $p(x) \equiv G(x).A(x)$ where A(x) is a shorthand for A(y(x)). Due to the intersection result, p can in principle be represented by a WCFG, but for a trigram model A, this grammar can become very large. Our approach will then be the following: we will start by taking the proposal $q^{(0)}$ equal to G, and then gradually refine this proposal by incorporating more and more accurate approximations to the full automaton A, themselves expressed as weighted automata of small complexity. We will stop refining based on having found a good enough approximation in optimization, or a sampler with sufficient acceptance rate in sampling.

To be more concrete, let us consider a PCFG G, with $\Sigma_x$ G(x)=1, where x varies among all the finite derivations relative to G. Such a PCFG is said to be consistent, that is, it is such that the total mass of infinite derivations is null. It is possible to sample from G by expanding derivations top-down using the conditional probabilities of the rules. It is also possible to find the derivation x of maximum value G(x) by a standard dynamic programming procedure.

We introduce a sequence of proposals denoted here as $q^{(0)}=G, q^{(1)}=q^{(0)}.B^{(1)}, \ldots, q^{(i+1)}=q^{(i)}.B^{(i+1)}, \ldots$, where each $B^{(i)}$ is a small automaton including some additional knowledge about the language model represented by A. Each $q^{(i)}$ will thus be a WCFG (not normalized) and refining $q^{(i)}$ into $q^{(i+1)}$ will then consist of a local update of the grammar $q^{(i)}$, ensuring a desirable incrementality of the refinements. Analogous to the HMM case, we have the following notations:

$$w_3(x_5 | x_3 x_4) \equiv \max_{x_2} w_4(x_5 | x_2 x_3 x_4) \quad (9)$$

$$w_2(x_5 | x_4) \equiv \max_{x_3} w_4(x_5 | x_3 x_4)$$

$$w_1(x_5) \equiv \max_{x_4} w_4(x_5 | x_4).$$

The optimization case is first considered. Suppose that, at a certain stage, the grammar $q^{(i)}$ has already incorporated knowledge of $w_1$(dog). Then suppose that the maximum derivation $x^{(i)}=\text{argmax}\, q^{(i)}(x)$ has the yield: the two dog barked, where $w_1$(dog) is much larger than the more accurate $w_2$(dog|two). We then decide to update $q^{(i)}$ into $q^{(i+1)}=q^{(i)}.B^{(i+1)}$, where $B^{(i+1)}$ represents the additional knowledge corresponding to $w_2$(dog|two). More precisely, let us define:

$$\alpha \equiv \frac{w_2(\text{dog} | \text{two})}{w_1(\text{dog})}. \quad (10)$$

The relation $\alpha \leq 1$ holds by the definition of $w_1, w_2$.

Figure 8:
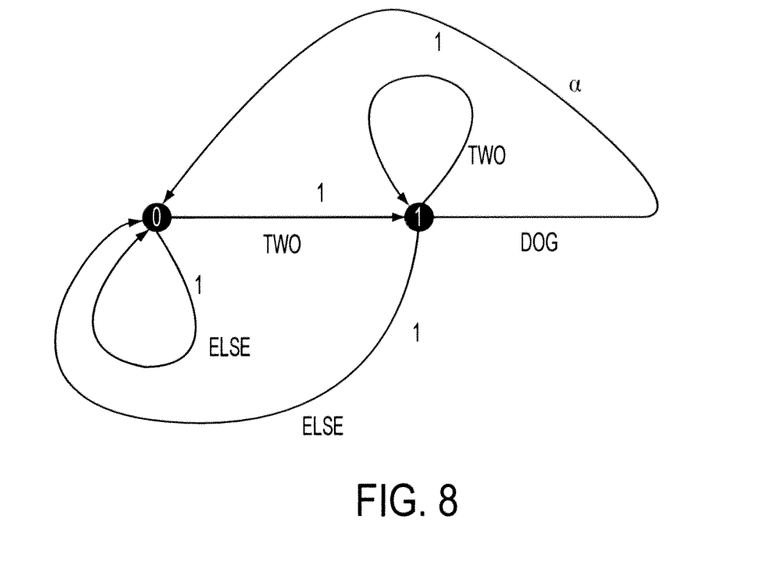

With reference to FIG. 8, a two-state automaton $B^{(i+1)}$ is shown, which we will call the "TwoDog" automaton. In this automaton, the state (0) is both initial and final, and (1) is only final. The state (1) can be interpreted as meaning "I have just produced the word two". All edges carry a weight of 1, apart from the edge labelled dog, which carries a weight of $\alpha$. The "else" label on the arrow from (0) to itself is a shorthand that means: "any word other than two", and the "else" label on the arrow from (1) to (0) has the meaning: "any word other than dog or two". It can be verified that this automaton has the following behavior: it gives a word sequence the weight $\alpha^k$, where k is the number of times the sequence contains the subsequence two dog. Thus, when intersected with the grammar $q^{(i)}$, this automaton produces the grammar $q^{(i+1)}$, which is such that $q^{(i+1)}(x)=q^{(i)}(x)$ if the yield of x does not contain the subsequence two dog, but such that $q^{(i+1)}(x)=\alpha^k.q^{(i)}(x)$ if it contains this subsequence k times. Note that because $q^{(i)}$ had already "recorded" the knowledge about $w_1$(dog), it now assigns to the word dog in the context of two the weight $w_2$(dog|two)=$w_1$(dog).$\alpha$, while it still assigns to it in all other contexts the weight $w_1$(dog), as desired. The detailed mechanics of intersecting the automaton "TwoDog" of FIG. 8 with the WCFG $q^{(i)}$ are not set forth here, but because this automaton only contains two states and only one edge whose weight is not 1, this intersection can be carried efficiently at each step, and will typically result in very local updates of the grammar.

Figure 9:
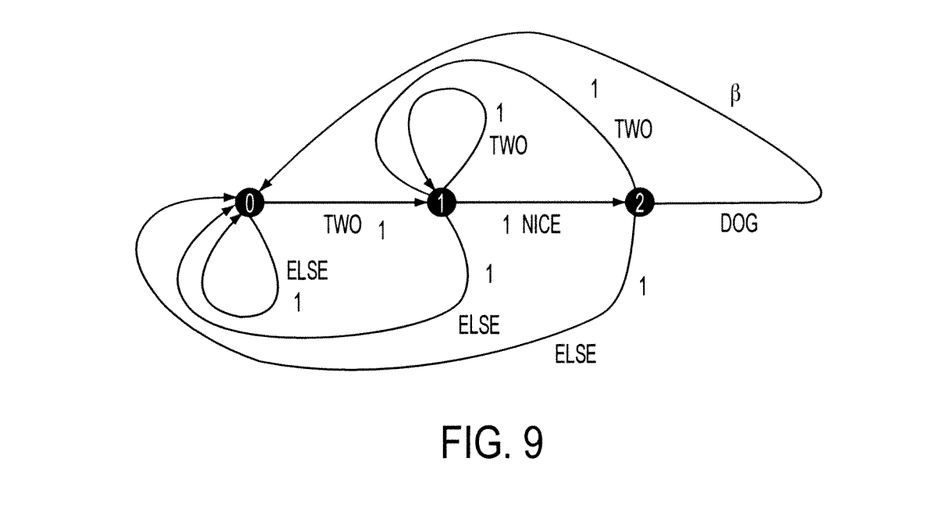

With reference to FIG. 9, higher-order n-grams can be registered in the grammar in a similar way. For instance, let's suppose that we have already incorporated in the grammar the knowledge of $w_2$(dog|nice) and that we now wish to incorporate the knowledge of $w_3$(dog|two nice). We can now use the automaton shown in FIG. 9, which is referred to herein as the "TwoNiceDog" automaton, where $\beta=w_3$(dog|two nice)/$w_2$(dog|nice). For optimization, we thus find the maximum $x^{(i)}$ of each grammar $q^{(i)}$, check the ratio $p(x^{(i)})/q^{(i)}(x^{(i)})$, and stop is this ratio is close enough to 1. Otherwise, we choose an n-gram in $x^{(i)}$ which is not yet registered, and would lower significantly the proposal $q^{(i)}$ ($x^{(i)}$) if added, build the automaton corresponding to this n-gram, and intersect this automaton with $q^{(i)}$.

Sampling is suitably done in the same way, the main difference being that we need to use dynamic programming to compute the sum of weights bottom-up in the grammars $q^{(i)}$. This amounts to using the sum-product semiring instead of the max-product semiring.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A non-transitory storage medium storing instructions executable by an electronic data processing device to perform a method comprising:
    performing rejection sampling to acquire at least one accepted sample of a function or distribution p over a space X;
    during the rejection sampling, refining a proposal distribution $q^{(n)}$ used in the rejection sampling responsive to rejection of a sample $x^* \epsilon X$ obtained in a current iteration of the rejection sampling to generate a refined proposal distribution $q^{(n+1)}$ for use in a next iteration of the rejection sampling wherein the refined proposal distribution $q^{(n+1)}$ is selected to satisfy the criteria:
    $p(x) \leq q^{(n+1)}(x) \leq q^{(n)}(x)$ for all $x \epsilon X$; and
    $q^{(n+1)}(x^*) < q^{(n)}(x^*)$
    wherein the method performed by executing the stored instructions further includes:
    initializing the proposal distribution $q^{(0)}=G$ for the first iteration of the rejection sampling where G denotes a probabilistic context-free grammar and the space X is a space of natural language derivations; and
    generating the function or distribution p as an intersection of G and a weighted finite state automaton (WFSA) representing a language model so that the performed rejection sampling acquires at least one accepted sample of a weighted context-free grammar comprising the intersection of the probabilistic context-free grammar G and the WFSA representing the language model.

2. The non-transitory storage medium of claim 1, wherein:
    the rejection sampling obtains the sample $x^*$ by random sampling of the space X;
    the rejection sampling accepts or rejects $x^*$ based on comparison of a ratio $p(x^*)/q(x^*)$ with a random draw; and
    the refined proposal distribution $q^{(n+1)}$ is selected to satisfy the criteria:
    $p(x) \leq q^{(n+1)}(x) \leq q^{(n)}(x)$ for all $x \epsilon X$;
    $q^{(n+1)}(x^*) < q^{(n)}(x^*)$; and
    a norm $\|q^{(n+1)}\|_\alpha$ is minimized where $\alpha < \infty$.

3. The non-transitory storage medium of claim 2, wherein the rejection sampling acquires a plurality of accepted samples and terminates when a cumulative acceptance rate of the rejection sampling exceeds a threshold.

4. The non-transitory storage medium of claim 2, where $\alpha=1$.

5. The non-transitory storage medium of claim 1, wherein:
    the rejection sampling obtains the sample $x^*$ such that $q^*=q^{(n)}(x^*)$ maximizes $q^{(n)}$ over the space X;
    the rejection sampling accepts or rejects $x^*$ based on a difference between or ratio of $q^*$ and $p(x^*)$; and
    the refined proposal distribution $q^{(n+1)}$ is selected to satisfy the criteria:
    $p(x) \leq q^{(n+1)}(x) \leq q^{(n)}(x)$ for all $x \epsilon X$;
    $q^{(n+1)}(x^*) < q^{(n)}(x^*)$; and
    a norm $\|q^{(n+1)}\|_\infty = \max\{q^{(n+1)}(x)\}$ is minimized.

6. The non-transitory storage medium of claim 5, wherein the rejection sampling acquires a single accepted sample.

7. The non-transitory storage medium of claim 6, wherein the rejection sampling outputs at least one of:
    the single accepted sample $x_{accepted}$ and
    a maximum value $p_{max}$ for the distribution p over the space X where $p(x_{accepted}) \leq p_{max} \leq q(x_{accepted})$.

8. The non-transitory storage medium of claim 6, wherein the rejection sampling outputs:
    a maximum value $p_{max}$ for the distribution p over the space X where $p(x_{accepted}) \leq P_{max} \leq q(x_{accepted})$ where $x_{accepted}$ is the single accepted sample; and
    an error metric for the maximum value $p_{max}$ computed based on $p(x_{accepted})$ and $q(x_{accepted})$.

9. The non-transitory storage medium of claim 1, wherein the non-transitory storage medium stores instructions executable by an electronic data processing device to perform said rejection sampling in one of two selectable modes including:
    (1) a sampling mode in which the rejection sampling obtains the sample $x^*$ by random sampling of the space X and accepts or rejects $x^*$ based on comparison of a ratio $p(x^*)/q(x^*)$ with a random draw; and
    (2) an optimization mode in which the rejection sampling obtains the sample $x^*$ such that $q^*=q^{(n)}(x^*)$ maximizes $q^{(n)}$ over the space X and the rejection sampling accepts or rejects $x^*$ based on a difference between or ratio of $q^*$ and $p(x^*)$.

10. The non-transitory storage medium of claim 9, wherein:
    (1) in the sampling mode the refined proposal distribution $q^{(n+1)}$ is selected to minimize a norm $\|q^{(n+1)}\|_\alpha$ where $\alpha < \infty$; and
    (2) in the optimization mode the refined proposal distribution $q^{(n+1)}$ is selected to minimize the norm $\|q^{(n+1)}\|_\infty$.

11. The non-transitory storage medium of claim 10, where $\alpha=1$.

12. The non-transitory storage medium of claim 9, wherein:
    in the sampling mode the rejection sampling acquires a plurality of accepted samples and terminates when a cumulative acceptance rate of the rejection sampling exceeds a threshold; and
    in the optimization mode the rejection sampling acquires a single accepted sample.

13. The non-transitory storage medium of claim 1, wherein X is a multidimensional space.

14. The non-transitory storage medium of claim 1, wherein the refined proposal distribution $q^{(n+1)}$ is selected to satisfy the criteria:
    $p(x) \leq q^{(n+1)}(x) \leq q^{(n)}(x)$ for all $x \epsilon X$;
    $q^{(n+1)}(x^*) < q^{(n)}(x^*)$; and
    a norm $\|q^{(n+1)}\|_\alpha$ is minimized.

15. An apparatus comprising:
    a non-transitory storage medium as set forth in claim 1; and
    an electronic data processing device configured to execute instructions stored on the non-transitory storage medium.

16. A method comprising:
using an electronic data processing device, performing a current iteration (n) of rejection sampling including:
obtaining a sample x* from a space X of natural language derivations;
accepting or rejecting the sample x* based on comparison of $q^{(n)}(x^*)$ and $p(x^*)$ where $q^{(n)}$ is a proposal distribution over the space X for current iteration (n) of the rejection sampling and p is a function or distribution over the space X which is an intersection of a probabilistic context-free grammar G and a weighted finite state automaton (WFSA) representing a language model; and
refining the proposal distribution $q^{(n)}$ to generate a refined proposal distribution $q^{(n+1)}$ over the space X satisfying the criteria:
$p(x) \leq q^{(n+1)}(x) \leq q^{(n)}(x)$ for all $x \in X$;
$q^{(n+1)}(x^*) < q^{(n)}(x^*)$; and
a norm $\|q^{(n+1)}\|_\alpha$ is minimized;
wherein the method further comprises initializing the proposal distribution as $q^{(0)}=G$ for the first iteration of the rejection sampling.

\* \* \* \* \*